UNITED STATES PATENT OFFICE.

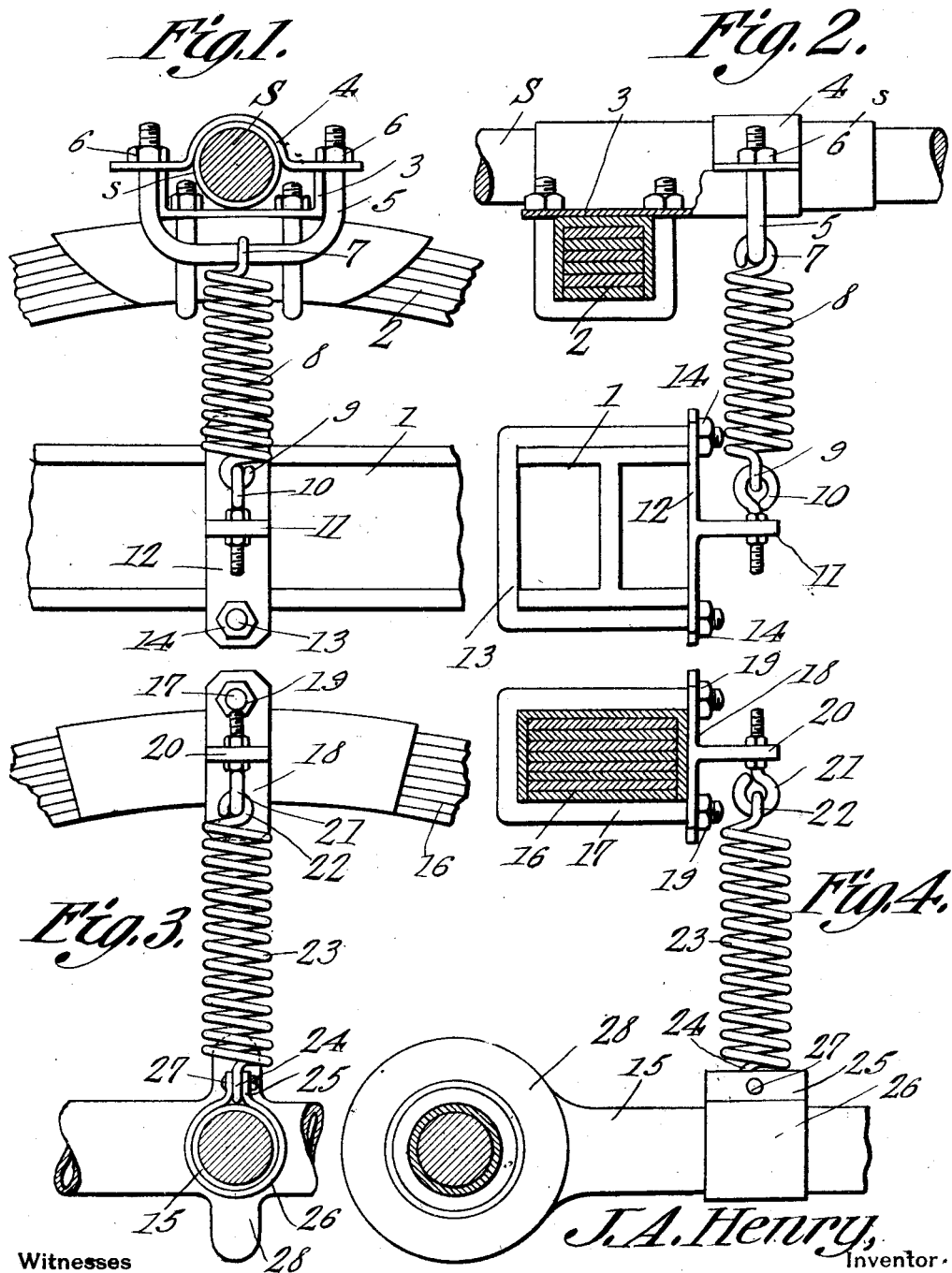

JOHN A. HENRY, OF HOPE, ARKANSAS.

SHOCK-ABSORBER.

1,128,977.   Specification of Letters Patent.   Patented Feb. 16, 1915.

Application filed July 13, 1914. Serial No. 850,688.

*To all whom it may concern:*

Be it known that I, JOHN A. HENRY, a citizen of the United States, residing at Hope, in the county of Hempstead and State of Arkansas, have invented a new and useful Shock-Absorber, of which the following is a specification.

The present invention relates to improvements in shock absorbers, one object of the present invention being the provision of a device which is readily adapted to be attached to automobiles now in use, the same constituting an attaching and supporting means for a tension spring, for disposition one to each spring of the motor car to limit the recoil thereof and produce the necessary cushion effect.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is one view illustrating the relation of the present shock absorber to the forward spring of a motor car, and to that type of car known as the Ford automobile. Fig. 2 is a similar view taken from the left side of the device as shown in Fig. 1. Fig. 3 is a view similar to Fig. 1 showing the present device applied to the rear spring of a Ford automobile. Fig. 4 is a side elevation taken from the left side as viewed in Fig. 3.

Referring to the drawings, and more particularly to Figs. 1 and 2 thereof, the numeral 1 designates the front axle and 2 the front spring of the motor car. This spring is attached in the usual manner to the journaling sleeve *s* for the crank shaft S of an explosion engine (not shown) and surrounding the crank shaft to the rear of the spring 2 is a channel iron or plate 3, so that the plate 4 which has oppositely extending apertured arms may rest thereupon, as viewed in Figs. 1 and 2 so that the metal bail 5 may be attached thereto by means of the nuts 6. Swingingly connected to the bail 5 and depending therefrom by means of the connection at 7 thereto, is a tension spring 8, whose eye 9 is attached to the eye bolt 10 adjustably connected to the lug 11 of the plate 12, said plate 12 being attached by means of the bail-shaped member 13 and the nut 14 to the axle 1. It will thus be seen that any recoil action of the spring or movement upward, is taken care of by the spring 8 which relieves the jar on such occasions.

In the form shown in Figs. 3 and 4, the installation is practically reversed from that shown in Figs. 1 and 2, to properly connect the same to operate upon the rear spring 16, the same being connected to the rear spring 16 and to the tube 15, which leads to and is carried by the differential and rear axle casing of the motor car. In this instance, the bail-shaped member 17 surrounds the spring 16 and by means of the nuts 19 hold the plate 18 thereto, the lug 20 being disposed to carry the eye bolt 21 which in turn is connected to the terminal 22 of the tension spring 23, the other terminal 24 of such spring being held between the apertured lugs 25 of the clamping band 26 by means of the bolt 27. This clamping band 26 is adjusted upon the tube 15 to the front of the differential casing 28, in such a position as to normally hold the spring 23 in a vertical position and in such a position as to take care of the recoil action of the spring 16, thus lessening the rebound and the shock occasioned thereby.

From the foregoing description, it will be evident that this construction of shock absorber is readily applied to the Ford automobile, and to each spring thereof, and consequently to the complete car.

What is claimed is:

The combination with a crank shaft supporting sleeve, a leaf spring and the front axle of a motor car, of a shock absorber for the spring including a channeled plate resting upon the spring and having the edges thereof disposed upwardly and astride the sleeve, two clamping bails surrounding the spring, one at each side of the sleeve for securing the plate to the spring, a plate having a curved portion to rest upon the sleeve from above with its ends resting upon the edges of the sides of the channel plate, such ends of such plate being extended beyond the sides of the channel plate and apertured, a U-shaped member having its terminals attached to the apertured ends of the second plate, a coiled spring having one terminal supported by the U-shaped member, and means for attaching the other terminal of the coiled spring to the axle.

In testimony that I claim the foregoing as my own, I have hereto affixed my signature in the presence of two witnesses.

JOHN A. HENRY.

Witnesses:
 M. C. SHO....,
 T. E. H......